United States Patent [19]

Bösch

[11] Patent Number: 4,458,905

[45] Date of Patent: Jul. 10, 1984

[54] SEALING DEVICE FOR A HIGH-VACUUM CLOSURE

[75] Inventor: Hubert Bösch, Lustenau, Austria

[73] Assignee: VAT Aktiengesellschaft Für Vakuum-Apparate-Technik

[21] Appl. No.: 209,507

[22] Filed: Nov. 24, 1980

[30] Foreign Application Priority Data

Nov. 26, 1979 [DE] Fed. Rep. of Germany ....... 2947585

[51] Int. Cl.³ .............................................. F16J 15/08
[52] U.S. Cl. ............................ 277/236; 285/DIG. 18
[58] Field of Search ................. 277/11, 236, 177, 168, 277/199, 172; 285/DIG. 18, DIG. 19

[56] References Cited

U.S. PATENT DOCUMENTS

| 3,146,006 | 8/1964 | Schmohl | 277/236 |
| 3,262,722 | 7/1966 | Gastineau et al. | 277/11 |
| 3,537,733 | 11/1970 | Martin | 277/236 |

FOREIGN PATENT DOCUMENTS

| 885304 | 12/1961 | United Kingdom | 277/236 |
| 1207420 | 9/1970 | United Kingdom | 285/18 |

Primary Examiner—Robert I. Smith
Attorney, Agent, or Firm—Toren, McGeady and Stanger

[57] ABSTRACT

A sealing device for a high-vacuum closure, such as used in a high-vacuum valve, where the surfaces effecting the seal are formed of metal. In forming the seal, a sealing member extends between and into contact with a pair of laterally spaced sealing surfaces. The surfaces on the sealing member which contact the sealing surfaces are rounded and have a radius of curvature equal to half the dimension of the sealing member between the sealing surfaces when it first contacts the surfaces during the closing step. The sealing surfaces can be frustoconical or spherical. When the device is closed, sealing force presses the sealing member between the sealing surfaces so that a relative rolling action takes place. Only elastic deformation occurs when the seal is effected.

7 Claims, 7 Drawing Figures

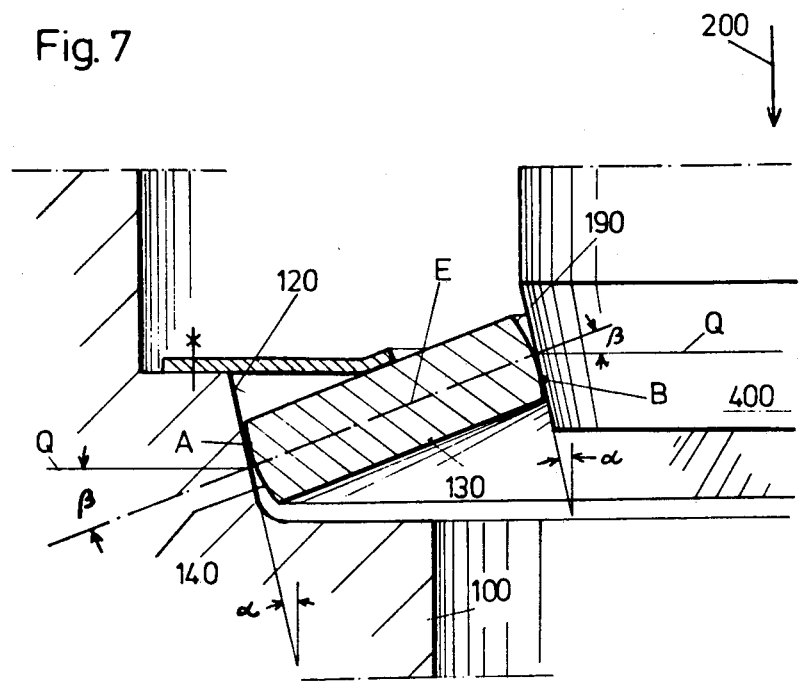

SEALING DEVICE FOR A HIGH-VACUUM CLOSURE

SUMMARY OF THE INVENTION

The present invention is directed to a sealing device formed of metal and used in a high-vacuum closure, such as in a high-vacuum valve, with the seal being formed by a first sealing surface constructed as a surface of revolution and a second sealing surface also constructed as a surface of revolution and arranged coaxially with the first sealing surface, with the two sealing surfaces being adjustable relative to one another in the coaxial direction.

Sealing devices are known for use in pipe lines and the like and such devices have low requirements with respect to tightness, such as a sealing device for a water pipe. In sealing devices of this type it is known to utilize rubber-elastic material O-rings between the parts of the sealing device which are movable relative to one another with these O-rings being advantageously placed under initial stress in a groove of the sealing part provided for that purpose. When the sealing device is closed, the closure elements are moved toward one another and the O-ring rests against and is squeezed by one of the sealing parts so that the desired tightness or sealing effect is attained. Sealing devices of this type are suitable in water pipes, for example, in which the tightness demands are not high and which, in addition, are operated at low temperatures.

In high-vacuum installations, such as nuclear plants and certain research centers, very exacting requirements are in effect regarding the tightness of a seal which cannot be provided by rubber-elastic sealing inserts. In addition, in such installations the closures must be heated to a temperature of about 400° C. As a result, all-metal valves have been developed which can divided into two groups. In the first group a metallic, but relatively soft, sealing member interacts with a second metallic, but hard, sealing member. When the valve is closed, the soft sealing member plastically adjusts to the hard sealing member to provide the desired seal. This plastic contact or deformation must be achieved with each new closing, however, it is possible only when the closing force is increased at each new closing. The service life of such a valve, that is the number of closings in which the valve will remain tight or provide the desired seal, is limited by the continuous increase of the closing force until the closing force becomes so great that it may not be increased for reasons of strength or when the force simply can no longer be applied. In the second group of all-metal valves, hard metallic sealing surfaces interact. In this group, the sealing element is made of a spring-hard material and the valve seat of an alloy of high-grade steel with chromium, nickel, molybdenum and/or titanium. The sealing element has its edge, which interacts with the sealing surface, rounded off. The sealing element is fixed, welded, screwed or fastened in some other manner either to the valve housing or the adjustable valve part. Because of the rounding of the edges on the sealing element, it can roll on the sealing surfaces under a high pressure when the valve is actuated so that sliding and failure of the valve due to insufficient lubrication is eliminated in high-vacuum valves of this type. Furthermore, slight relative movements between the sealing members due to temperature changes in the closed valve and the resulting thermal expansion can be absorbed by the valve of this type without leading to any damage of the sealing surfaces in direct contact with one another. By means of such a valve device, it is possible to achieve degrees of tightness of $1.10^{-9}$ torr. 1/sec, measured with helium for several thousand closing operations without any need to increase the closing force.

Although these last-described all-metal sealing devices have proved to be effective, they are not without disadvantages. Since these all-metal sealing devices are used in high-vacuum installations, they must be heated to degasify the surfaces. Temperatures up to 450° are required. Special devices afford the heating effect and such devices are located on the exterior of the sealing device and supply heat to the sealing device so that it gradually penetrates into the interior of the device. During subsequent cooling, the heat flows from the interior to the exterior. In one case the temperature gradient or drop is toward the inside and in the other case toward the outside. The vacuum present in the sealing device has a considerable insulation capacity. Accordingly, significant temperature differences occur in the sealing device and these differences may range up to 100° C. during heating or cooling. As a result, dimensional changes take place in the structural elements of the sealing device due to thermal expansion which causes relative movement between the structural elements and leads to shearing deformation which, in turn, destroys the sealing surfaces whether by cold welding or by sliding friction. Compensating movement caused by thermal expansion is possible only to a limited extent because, in these known constructions, the sealing member is fixed unilaterally at the edge so that during such movement the sealing member can break at the fixing point or possibly only cracks may develop, however, such cracks are sufficient to prevent the seal from remaining tight. It is also possible that the sealing member is plastically deformed and, thus, permanently deformed at the fixing point when the compensating movement is great with the consequence that the seal is no longer tight.

It is the primary object of the present invention to overcome these disadvantages. Accordingly, the present invention proposes an all-metal sealing device which permits relatively great compensation movement and adjustment movement between the individual components forming the sealing device without negatively affecting or impairing the extraordinary sealing capacity of the sealing device. Surprisingly, this outcome is achieved, in accordance with the invention, by the combination of certain features which are known in part, that is, utilizing sealing surfaces spaced laterally apart when the sealing device is closed with an annular sealing member positioned between and sealingly bridging the distance between the sealing surfaces. The edges or other surfaces of the sealing member contacting the sealing surfaces are rounded off and the dimension of the sealing member between the sealing surfaces is approximately equal to twice the radius of curvature of the rounded edges. The sealing member and the sealing surfaces, which may be frusto-conical and/or spherical, are formed of practically non-ductile materials. When the sealing devices close, the sealing force acting on the sealing surfaces and the sealing member presses them together in the range of exclusive elastic deformation and only where relative rolling action takes place. In view of the above-mentioned state of the art, such measures are not obvious because in a sealing device having a tightness of $1.10^{-9}$ torr 1/sec, measured in helium, the expert would attempt to keep the contact area between the sealing parts as small as possible. However, the present invention deviates from this requirement which is compelling to any expert in the field, because the sealing area is increased by more than 100% in accordance with the present invention. Although the components forming the seal must be manufactured with appropriate precision, higher tolerances are accepted in this instance because the sealing member is a quasi automatic and freely movable structural component which has a high degree of adjustment because of its mobility. Since the opposite surfaces of the sealing member in contact with the sealing surfaces are rounded off, and the dimension of the sealing member between the sealing surfaces when just in contact with them is about equal to twice the radius of curvature of the rounded off surfaces, the sealing member can roll on both sealing surfaces when the device is closed or opened or when movement occurs due to thermal expansion without resulting in sliding friction which leads to cold welding and, as a result, destruction of the sealing surface. Since the ratio of thickness relative to the width of the valve body cross section is advantageously in the range of 1:3–1:10, the sealing member can absorb deformations itself, that is, in the elastic range, which deformations are caused by the substantial sealing force acting on the sealing member. The sealing surfaces as well as the sealing member consist of practically non-ductile materials, for instance, nickel materials with a nickel content of 35% and more, with chromium and/or cobalt as additional alloy components; stellites and alloys of high-grade steel with chromium, nickel, molybdenum and/or titanium can also be used. The substantial closing pressures generated during the closing of the device only cause a superficial deformation in the elastic range.

Due to the present invention, the replacement of the sealing member is simplified. The seal is arranged so that the sealing forces extend perpendicularly to the sealing surfaces when the device is closed and these sealing forces act in a plane containing the center of gravity of the cross-section of the sealing member.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 7 displays a partial sectional view of the sealing device in accordance with the present invention.

DETAIL DESCRIPTION OF THE INVENTION

Figure 1:
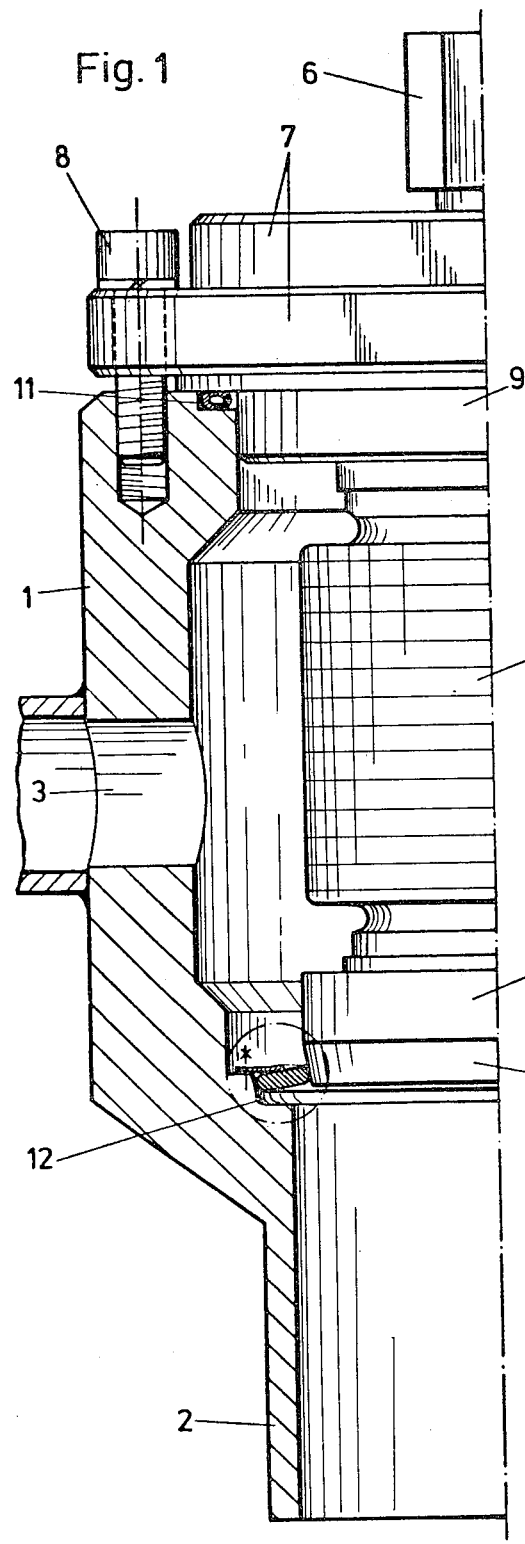
FIG. 1 is a partial longitudinal sectional view taken through a valve.
Figure 6:
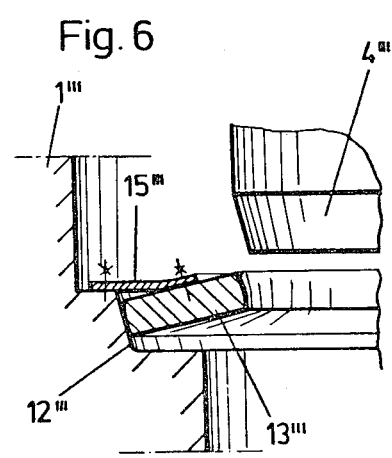
FIG. 6 illustrates another arrangement of the fixing of the sealing member.

In FIG. 1 a longitudinal section is shown through half of a high-vacuum shut-off valve having a housing 1 with a connection piece 2 for attachment to a high-vacuum pump and an opening 3 for connection to a device to be evacuated. One sealing surface 4 is formed by a frusto-conical surface of a sealing plate attached to a suitable carrier 5 or formed integrally with the carrier. For axial displacement of this frusto-conically shaped sealing surface 4 relative to the other sealing surface, the carrier is connected to a spindle 6 provided with a thread, in FIG. 1 only the upper end of the spindle 6 is visible. Spindle 6 is mounted in a housing cover 7 rigidly connected to the housing 1 by screws 8. To seal the spindle, a flange plate 9 is inserted into the upper opening of the housing and a metal bellows 10 surrounds the spindle and is tightly fastened to the lower part of the flange plate 9. The lower end of the metal bellows 10 is tightly connected to the carrier 5. A sealing ring 11 is inserted into an annular step between the plate 9 and the housing 1. In this arrangement, the other sealing surface 12 is provided in the housing 1 and is also in the form of a frusto-conical surface. Resting freely on the frusto-conical surface 12 is an annular disk or sealing member 13 whose radially inner and outer edges have a rounded or convex surface. This annular disk-sealing element 13 also has a frusto-conical shape being in the form of a cup spring. To prevent the sealing member 13 from being lifted off the frusto-conical surface 12, a holder 15 projects inwardly from the housing over the sealing member and sits on the upper end of the sealing surface 12. The holder 15 is fastened to the housing 1. Holder 15 can be a single piece or it may consist of several finger-like pieces. Radially inwardly of its attachment to the housing, the holder 15 bears against the upper side of the annular disk-sealing member 13. The holder has a spring elastic characteristic. As illustrated in FIG. 6, the radially inner portion of the holder can be screwed, welded or otherwise connected to the sealing member 13.

Figure 2:
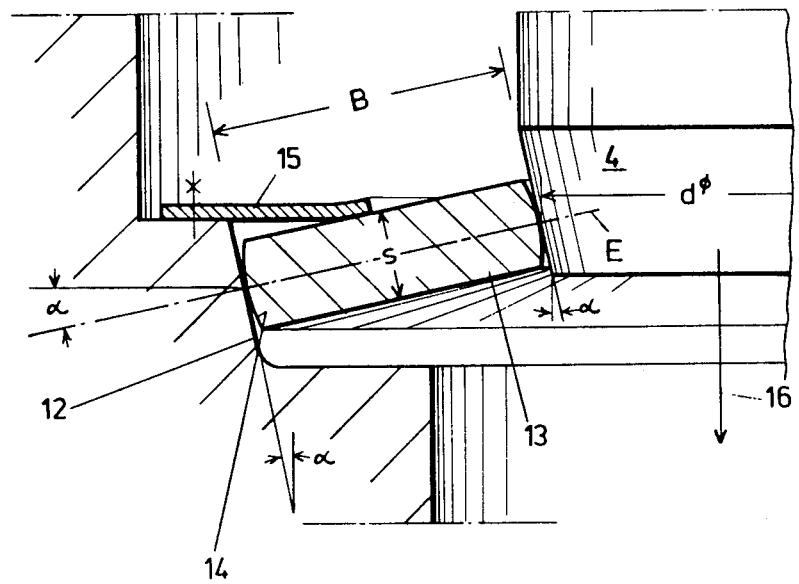
FIGS. 2 and 3 illustrate, on a larger scale, the circled portion of FIG. 1 with the valve in FIG. 2 being shown closed and in FIG. 3 being shown open.
Figure 3:
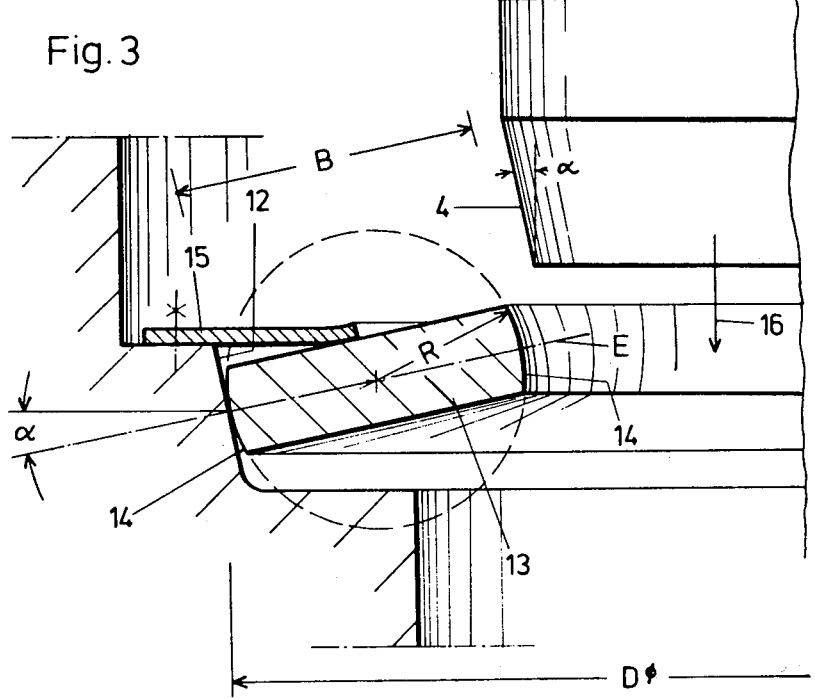

In FIGS. 2 and 3, sealing member 13 is illustrated on an enlarged scale, as compared to FIG. 1. Sealing member 13 is a frusto-conically shaped cup spring-like annular disk with radially inner and outer convex rounded edges 14. The radius of curvature R of each of the rounded edges is essentially equal to half of the width B of the annular disk-sealing member, that is, the width between the radially inner and radially outer edges when the sealing member initially commences contact with these surfaces as the valve is closed. As mentioned above, both of the sealing surfaces 4, 12 are annular frusto-conical surfaces with the middle diameter D of the sealing surface 12 formed in the housing 1 corresponding to the outside diameter of the annular disk-sealing member 13, so that the sealing member rests freely on the sealing surface, note FIG. 3 showing the diameter D with the sealing member 4 displaced axially in the open position. The sealing surfaces 4, 12 and the sealing member 13 are arranged relative to one another so that the central plane E of the sealing member 13, note FIGS. 2 and 3, extends essentially perpendicular to the sealing surfaces, note FIG. 2. When the sealing surface 4 is moved in the axial direction by actuating the valve spindle 6 in the direction of arrow 16, the sealing surface 4 contacts at its middle portion between the upper and lower ends against the radially inner rounded edge 14 of the sealing member 13. The middle diameter of the frusto-conical sealing surface 4 corresponds approximately to the inner diameter d of the sealing member 13, note FIG. 2. The initial contact of the sealing surface 4 with the sealing member 13, as the sealing device is closed, is illustrated in FIG. 2. In this arrangement, the sealing surfaces 4, 12 are essentially parallel.

When a higher closing pressure is subsequently applied through the spindle 6, the sealing surface 4 travels further in the direction of the arrow 16, as compared to the arrangement shown in FIG. 2, and the contacting surfaces are superficially deformed in the elastic range due to the high pressure at which these parts are pressed together. As a result of the selected arrangement, the force applied through the spindle is increased in a high step-up ratio, and this step-up ratio is basically determined by the angle $\alpha$ which corresponds to the cone angle of the frusto-conical surfaces, note FIGS. 2 and 3. The disk-like sealing member 13 rolls with its radially inner and outer edges 14 on the respective sealing surfaces 4, 12. The sealing member can be deformed to a smaller or greater extent. The extent of its deformation depends, among other things, on its thickness S as shown in FIG. 2. With respect to the relative movements and rolling action and the like discussed above, it must be noted that these movements and rolling paths are very small, since the sealing surfaces 4, 12 and the sealing member 13 are formed of non-ductile, metallic materials. It can be seen in FIG. 2 that, even though relatively great axial movements occur between the sealing surfaces 4, 12, such as by thermal expansion or temperature differences, such movements can easily be absorbed by this sealing device, because the sealing member 13 rolls slightly on the sealing surfaces without impairing the sealing capacity, since the high sealing forces applied via the spindle 6 permit such differences without any problems.

Figure 4:
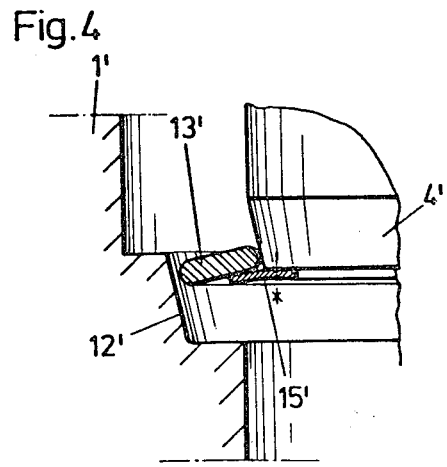
FIG. 4 another embodiment of the invention showing the manner of fixing the sealing member.

In FIG. 4 a modified arrangement of the sealing device is illustrated with the holder 15' for the sealing member 13' being fixed to the movable part 4' and not to the housing 1'.

In the illustrated and described embodiment, sealing surfaces 4, 12 are axially extending frusto-conical surfaces. It is also possible, in accordance with the present invention, to form these sealing surfaces as spherical surfaces, and concave as well as convex surfaces could also be used. It is also possible to use a frusto-conical surface and a spherical surface as the sealing surfaces in a single sealing device, since these surfaces do not directly interact with one another when the sealing device is closed. These surfaces are always formed in such a way that rounded edges 14 of the sealing member 13 can roll freely on the sealing surfaces 4, 12 when the sealing device is opened and closed. With respect to the rolling action mentioned above, it is noted that the distance travelled and the amount of deformation is very small because hard, non-ductile materials are paired with each other so that the elastically deformable range of the material is not exceeded by the externally applied forces.

Figure 5:
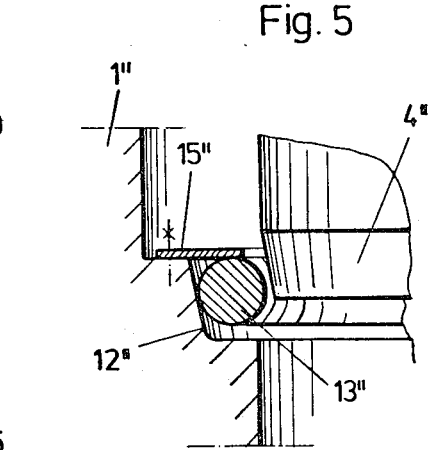
FIG. 5 is another embodiment illustrating a different shape of the sealing member.

In FIG. 5 another embodiment of the invention is shown with a sealing member 13" being in the form of a torus, that is, a ring-shaped member having a circular radial section. At least theoretically, this sealing member 13" could travel along a great rolling path with the external load always acting in the median plane of the member. It must be taken into consideration, however, that because of the great hardness of the material used for this toroidal sealing member 13" and due its massive cross section, this sealing member is extremely stiff and torsion-resistant compared to the above-described sealing members, whereby this massive sealing member is able only reluctantly to follow the externally applied closing forces which cause its deformation.

The forces acting on the sealing member cause a deformation of the surface roughness in the elastic range and, in addition, the sealing member is slightly deformed in its entirety by the sealing forces. This deformation, however, is very slight because the arrangement is selected so that, when the sealing device is closed, the sealing forces act perpendicularly to the sealing surfaces and these sealing forces act in a plane containing the center of gravity of the cross section of the sealing member. This plane does not have to coincide with the median plane E of the sealing member, and this effect is also true when the sealing member 13 rolls on the sealing surfaces 4, 12 during the opening and closing of the valve or due to relative movement caused by thermal expansion.

In another advantageous arrangement, sealing member 130 in the form of a frusto-conical annular disk is positioned so that, at least at the moment of initial contact during the closing procedure of the sealing device, the median plane E of the sealing member 130, note FIG. 7, includes an angle $\beta$ with a cross-sectional plane Q extending through the frusto-conical sealing surface 120 or 400 and this angle is greater than the cone angle $\alpha$ of the sealing surface. Because of this arrangement, the lines of contact A, B between the rounded surfaces 140 of the sealing member 130 and the frusto-conical sealing surfaces 120 and 400 are offset slightly from the median plane E at the moment of the first contact of the sealing member with the sealing surface 400 during the closing procedure. In case A the line contact is above the median plane E and in the other case B the line of contact is below the median plane. When sealing pressure is applied in the axial direction, that is, in the direction of arrow 200, the sealing member 130 rolls on the sealing surfaces and the lines of contact A and B are shifted toward the median plane E so that the contact lines effecting the sealing action are essentially in the median plane E when the sealing device is closed. The adjustment and relative movements between the parts forming the seal due to temperature changes and temperature differences during heating of the sealing device can be positive or negative relative to the median plane E. In both cases there is sufficient tolerance for the adjustment of the sealing member so that the seal provided by the lines of contact do not significantly deviate from the median plane E.

While specific embodiments of the invention have been shown and described in detail to illustrate the application of the inventive principles, it will be understood that the invention may be embodied otherwise without departing from such principles.

What is claimed is:

1. Sealing device for a high-vacuum closure movable repeatedly between the opened and closed positions with the surfaces forming the seal being metal, such as for a high-vacuum valve, comprising a first sealing surface formed as a surface of revolution, a second sealing surface formed as a surface of revolution and being coaxial with said first sealing surface, said first and second sealing surfaces being displaceable in the axial direction relative to one another when the high-vacuum closure is moved between the opened and closed positions, said first and second surfaces being movable between an open position and a closed position with said first and second sealing surfaces being disposed in spaced facing relation in the closed position and defining therebetween an annular space, a separate annular sealing member located within and bridging the annular space between and being in sealing contact with said first and second sealing surfaces in the closed position, said sealing member having third sealing surfaces thereon for contacting said first and second sealing surfaces in the closed position, said third sealing surfaces being rounded and each having a radius of curvature equal to one-half the width of said sealing member representing the distance between said third sealing surfaces when said third sealing surfaces make initial contact with said first and second sealing surfaces as the first and second sealing surfaces are moved into the closed position, said sealing member and said first and second sealing surfaces being formed of substantially non-ductile metallic materials and in the closed position the sealing force applied acts on said first and second sealing surfaces and said third sealing surfaces of said sealing member and presses said surfaces together in an exclusively elastic deformation range and only by said surfaces rolling relative to one another, said sealing member freely rests on one of said first and second sealing surfaces when the sealing device is open, a body forming the one of said first and second sealing surfaces on which said sealing member freely rests, a holder secured to said body and in contact with said sealing member at a location spaced radially from the location of contact between said sealing member and the one of said first and second sealing surfaces on which said sealing member freely rests so that said holder prevents said sealing member from axial movement, said holder projecting from the one said first and second sealing surfaces on which said sealing member freely rests toward the other said sealing surface.

2. Sealing device, as set forth in claim 1, wherein said sealing member comprises a frusto-conically shaped annular disk of solid radial cross-section having a midplane extending transversely of the ocmmon axis of said first and second sealing surfaces and being spaced approximately equidistantly of the surfaces of said sealing member extending in the direction between said first and second sealing surfaces with said plane at the moment of initial contact during the closing procedure being approximately perpendicular to said first and second sealing surfaces, and the width of said sealing member representing the spacing between the first and second sealing surfaces in the closed position.

3. Sealing device, as set forth in claim 1, wherein said sealing member is toroidal and has a solid circular radial section, and the diameter of the radial section of said sealing member representing the spacing between the first and second sealing surfaces in the closed position.

4. Sealing device, as set forth in claim 1, wherein said holder being formed of a spring-elastic material.

5. Sealing device, as set forth in claim 1, wherein said holder being rigidly connected to said sealing member in approximately the mid-region between said first and second sealing surfaces.

6. Sealing device, as set forth in claim 1, said first and second sealing surfaces and said third sealing surfaces being arranged so that the sealing forces extend perpendicularly to said sealing surfaces when the sealing device is closed with the sealing forces acting in a plane containing the center of gravity of the radial cross-section of said sealing member.

7. Sealing device, as set forth in claim 1, wherein said sealing member is in the form of a frustoconical annular disk and is positioned relative to said first and second sealing surfaces so that at least at the moment of contact with both first and second sealing surfaces during the closing procedure the median plane of said sealing member extends transversely of the axial direction of the first and second sealing surfaces and is spaced approximately equidistantly between the surfaces of said sealing member extending between the first and second sealing surfaces and includes an angle $\beta$ with a plane extending perpendicularly of the axes of said first and second sealing surfaces and said angle $\beta$ being greater than the cone angle ? of said first and second sealing surfaces.

* * * * *